US008622293B2

(12) United States Patent
Ueda et al.

(10) Patent No.: US 8,622,293 B2
(45) Date of Patent: Jan. 7, 2014

(54) LABEL ISSUING DEVICE AND LABEL ISSUING METHOD

(75) Inventors: Hiroyuki Ueda, Shizuoka (JP); Masahito Sano, Shizuoka (JP); Nobuo Watanabe, Shizuoka (JP); Hiroyuki Koyama, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 142 days.

(21) Appl. No.: 13/214,367

(22) Filed: Aug. 22, 2011

(65) Prior Publication Data

US 2012/0043375 A1 Feb. 23, 2012

(30) Foreign Application Priority Data

Aug. 23, 2010 (JP) .................................. 2010-186588
Jul. 1, 2011 (JP) .................................. 2011-147574

(51) Int. Cl.
*G07B 15/02* (2011.01)

(52) U.S. Cl.
USPC .......................................... 235/384; 235/380

(58) Field of Classification Search
USPC .............................. 235/375, 380, 381, 384, 3
See application file for complete search history.

(56) References Cited

U.S. PATENT DOCUMENTS

| 2010/0241658 | A1* | 9/2010 | Rathurs et al. | 707/769 |
| 2010/0324728 | A1* | 12/2010 | Rosenblum | 700/242 |
| 2011/0198400 | A1 | 8/2011 | Sano | |
| 2012/0047037 | A1 | 2/2012 | Ueda et al. | |
| 2012/0047038 | A1 | 2/2012 | Sano et al. | |
| 2012/0047039 | A1 | 2/2012 | Sano et al. | |
| 2012/0047040 | A1 | 2/2012 | Ueda et al. | |

FOREIGN PATENT DOCUMENTS

| JP | 01-191070 | 8/1989 |
| JP | 06-092338 | 4/1994 |
| JP | 06-223271 | 8/1994 |
| JP | 07-242221 | 9/1995 |
| JP | 07-257524 | 10/1995 |
| JP | 08-069533 | 3/1996 |
| JP | 11-017400 | 1/1999 |
| JP | 11-337315 | 12/1999 |
| JP | 2002-245437 | 8/2002 |
| JP | 2003-104554 | 4/2003 |
| JP | 2006-168792 | 6/2006 |
| JP | 2007-050921 | 3/2007 |
| JP | 2008-134731 | 6/2008 |
| JP | 2009-119795 | 6/2009 |

OTHER PUBLICATIONS

Japanese Office Action for Japanese Application No. 2011-147574 mailed on Aug. 14, 2012.

* cited by examiner

*Primary Examiner* — Karl D Frech
(74) *Attorney, Agent, or Firm* — Turocy & Watson, LLP

(57) ABSTRACT

A label issuing device includes an imaging portion, an image output portion that outputs images captured by the imaging portion, an object recognition portion that recognizes a specific object by reading a feature amount of the output images, an information reading portion that reads information for the recognized object from a file storing information related to the object, and a label issuing portion that prints the read information for the object on a label and issues the label.

11 Claims, 10 Drawing Sheets

FIG.13

LABEL ISSUING DEVICE AND LABEL ISSUING METHOD

CROSS-REFERENCE TO RELATED APPLICATION

The present application contains subject matter related to that disclosed in Japanese Priority Patent Application JP 2010-186588 filed in the Japan Patent Office on Aug. 23, 2010 and Japanese Priority Patent Application JP 2011-147574 filed in the Japan Patent Office on Jul. 1, 2011, the entire contents of which are hereby incorporated by reference.

FIELD

Embodiments described herein relate generally to a label issuing device and a label issuing method.

BACKGROUND

A store such as a supermarket uses a label printer which prints a label which is attached to a product and indicates a product name or a price. The label printer reads product information such as a product name or a price from a product master to thereby generate printing data to be printed on a label, and prints a label based on the generated printing data.

However, in recent years, there have been increasing part-timers having no professional knowledge, and, for example, if the part-timers pack fish fillets and give labels thereto in the backyard, they are confused because of not knowing the kind of fish.

DESCRIPTION OF THE DRAWINGS

FIG. 13 is a plan view illustrating an example of an issued label.

DETAILED DESCRIPTION

According to one embodiment, there is provided a label issuing device including imaging means, image output means for outputting images captured by the imaging means, object recognition means for recognizing a specific object by reading a feature amount of the output images, information reading means for reading information for the recognized object from a file storing information related to the object, and label issuing means for printing the read information for the object on a label and issuing the label.

Hereinafter, a label issuing device and a label issuing method according to the embodiment will be described with reference to the drawings by exemplifying a label printer. The label issuing device according to the embodiment is applied to a label printer issuing a label on which product information such as a product name or a price of a product is printed, in a supermarket or a food processing plant.

Figure 1:
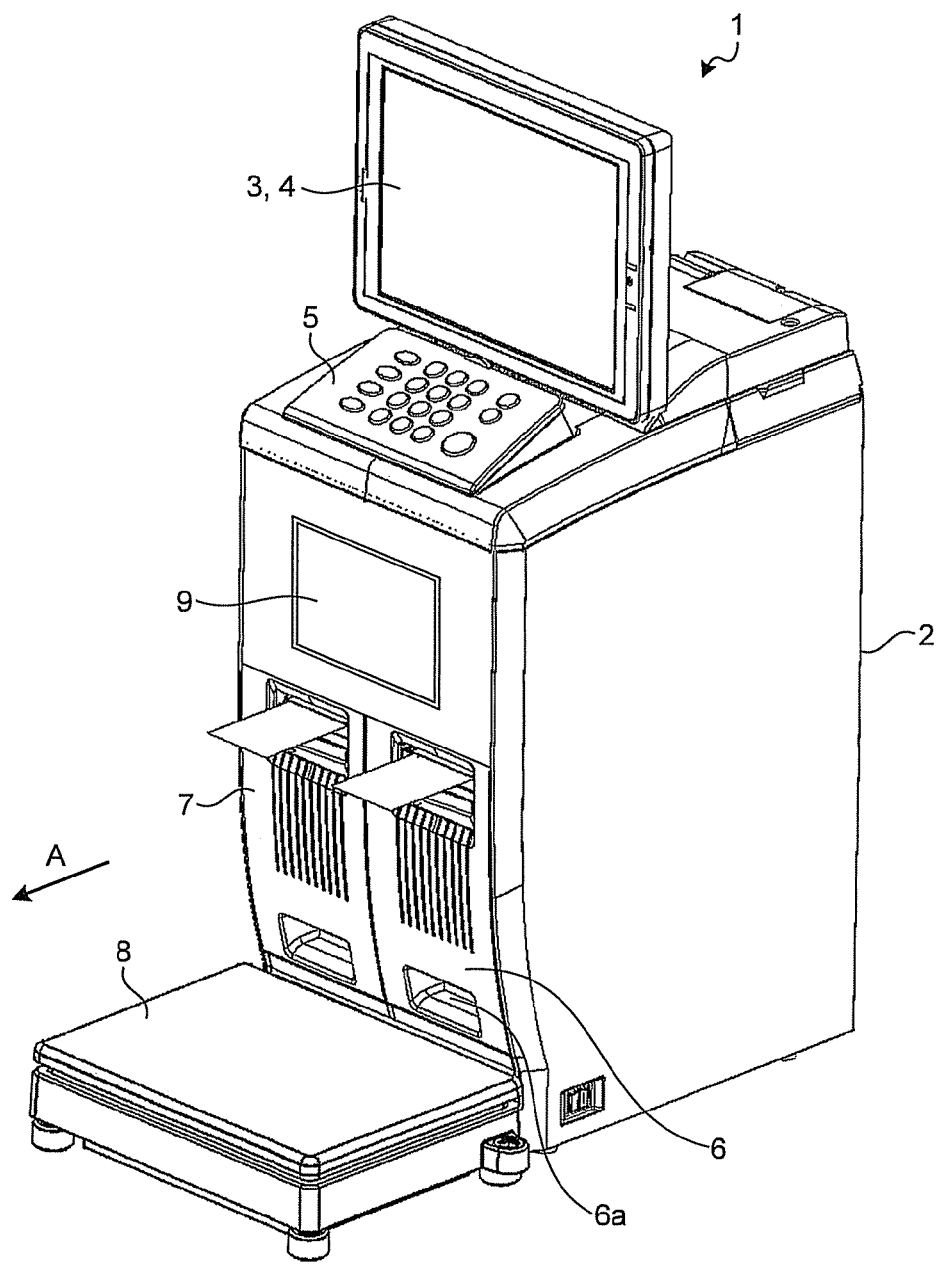
FIG. 1 is a perspective view illustrating an exterior of a label printer according to a first embodiment.

FIG. 1 is a perspective view illustrating an exterior of a label printer 1 according to a first embodiment. The label printer 1 prints information related to a product on a label and issues the printed label. A display such as a display device 3 is provided at an upper part of a main body 2 of the label printer 1. The display device 3 displays a label registration screen for editing product information printed on a label. In addition, a touch panel 4 is provided on a surface of the display device 3. A keyboard 5 is provided at an upper surface of the main body 2 of the label printer 1. In addition, a weighing scale 8 which places a product thereon and weighs the product is provided at a front lower part of the main body 2 of the label printer 1.

Further, the main body 2 of the label printer 1 contains two printer units, a first printer 6 and a second printer 7 which are typically provided in parallel. The first printer 6 and the second printer 7 have the same configuration, and thus the first printer 6 will be hereinafter described. The first printer 6 can be pulled from the main body 2 as shown in FIG. 2 by drawing the first printer in a direction A in a state of hanging a finger on a groove section 6a provided at a lower part of a front panel of the first printer 6.

Figure 2:
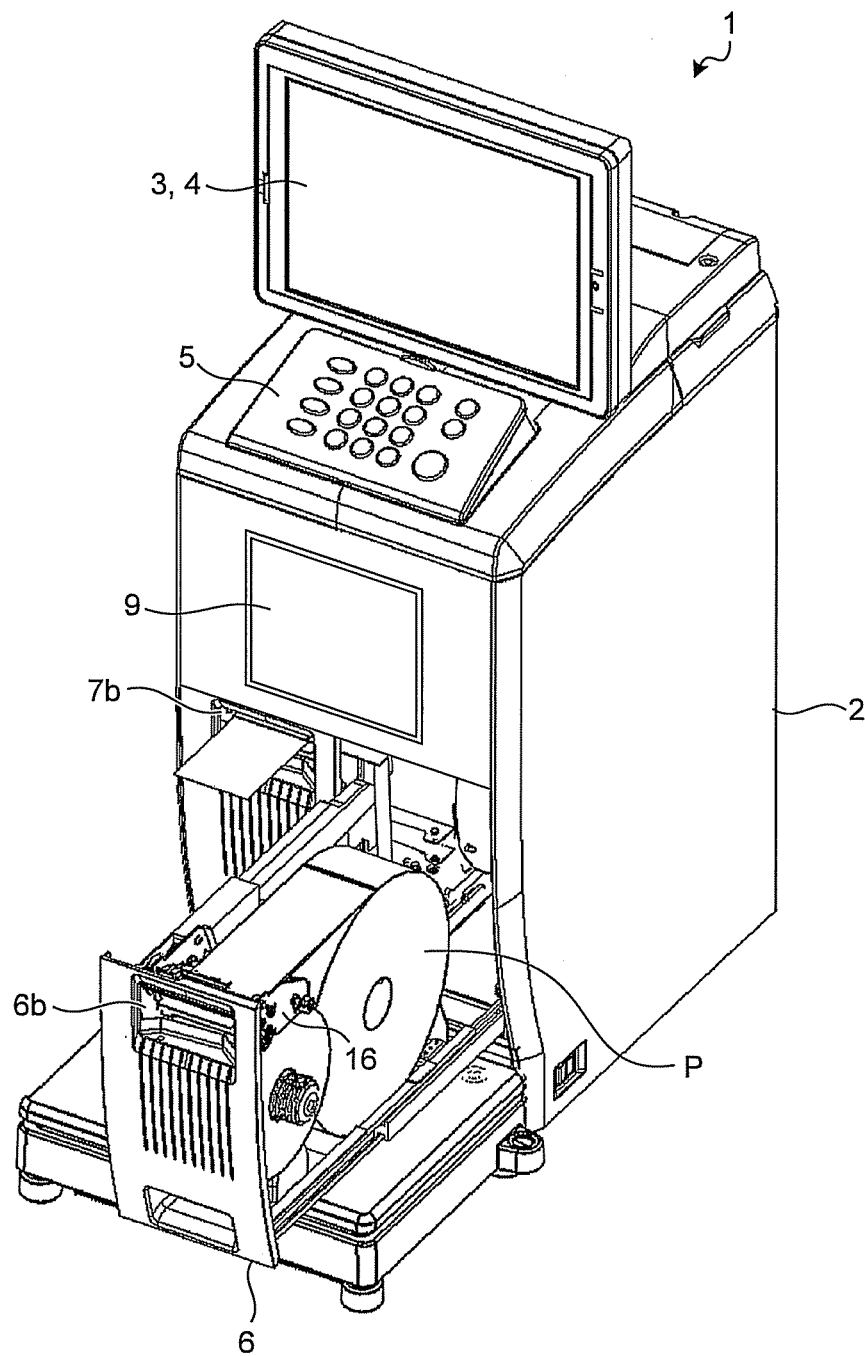
FIG. 2 is a perspective view illustrating a state where a first printer is pulled from a main body.

FIG. 2 is a perspective view illustrating a state where the first printer 6 is pulled from the main body 2. Inside the first printer 6, roll-shaped label paper P where labels are attached to a cardboard is held by a holding shaft (not shown) to be attachable and detachable. The first printer 6 has a printer head 16 such as a thermal head. The printer head 16 prints characters, symbols, barcodes, two-dimensional codes, and the like on the label paper P. The printed labels are discharged from a label issuing outlet 6b provided at an upper part of the front panel of the first printer 6. In addition, in a similar manner, the second printer 7 also has a label issuing outlet 7b and a printer head 17 (refer to FIG. 3).

The label printer 1 reads product information such as a product name or a price from a PLU file F1 (described in detail later; refer to FIG. 4) to thereby generate printing data printed on a label, and prints a label based on the generated printing data. Further, the label printer 1 includes a product reading portion 10 (refer to FIG. 3).

The product reading portion 10 disposes an imaging portion 104 (refer to FIG. 3) inside a reading window 9.

An operator (store clerk) brings a product, and moves the product to the weighing scale 8. In the course of the movement, the product faces the reading window 9 of the label printer 1. At this time, the image portion 104 (refer to FIG. 3) disposed inside the reading window 9 images the product. The product reading portion 10 detects the overall product or a part thereof included in the images captured by the imaging portion 104. If the label printer 1 detects that the overall product or a part thereof is included in the image captured by the imaging portion 104, the label printer 1 specifies a product for each of the products included in the captured images by referring to the PLU file F1 (described in detail later; refer to FIG. 4) correlated with an image of a product and recognizing a product which is a specific object from the images of the overall product or a part thereof captured by the imaging portion 104 of the product reading portion 10.

Figure 3:
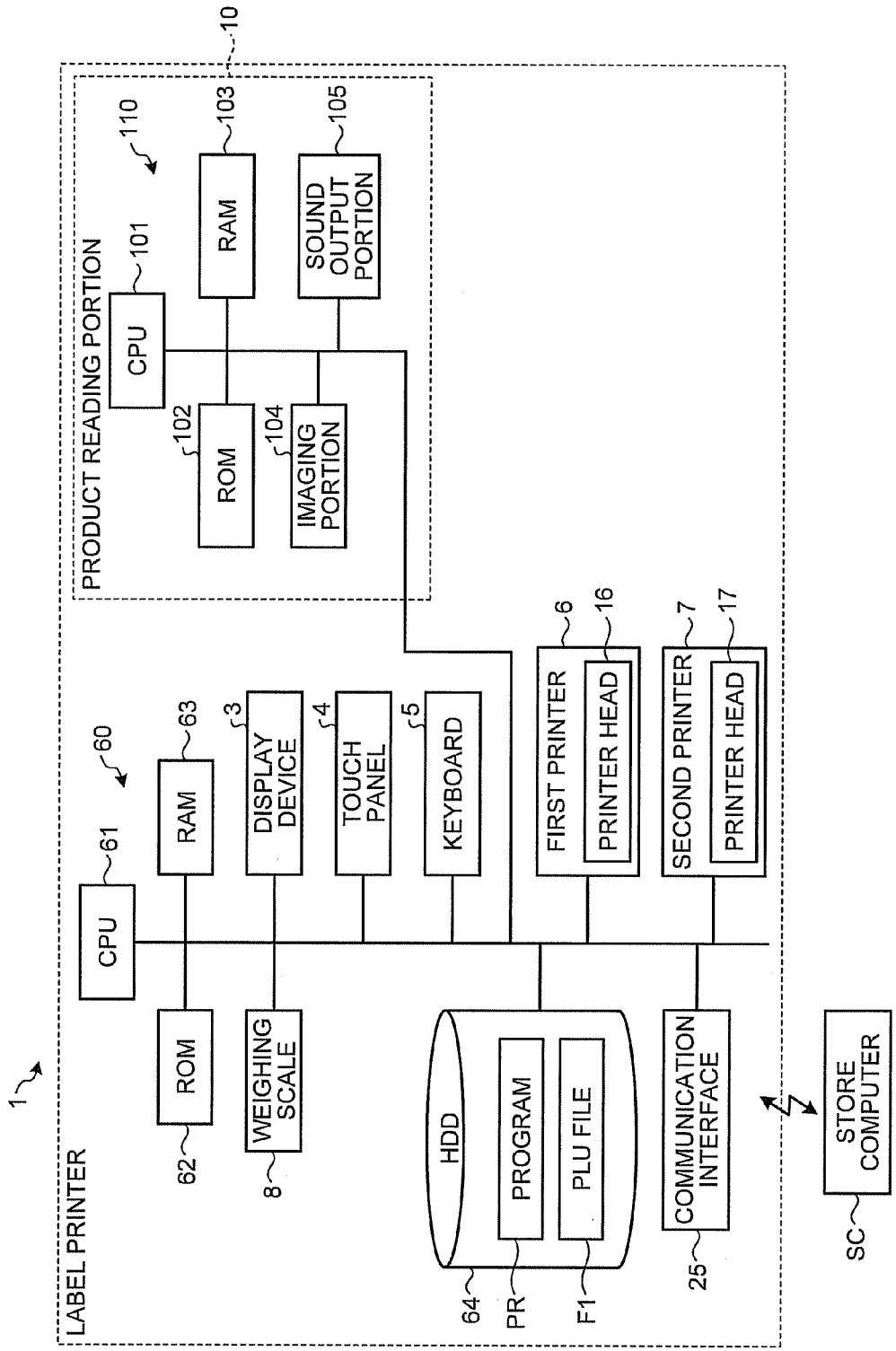
FIG. 3 is a block diagram illustrating a hardware configuration of the label printer.

FIG. 3 is a block diagram illustrating a hardware configuration of the label printer 1. The label printer 1 includes a microcomputer 60 as an information processing portion for executing information process. The microcomputer 60 has a CPU (Central Processing Unit) 61 which executes various kinds of calculation processes and controls respective parts, a ROM (Read Only Memory) 62, and a RAM (Random Access Memory) 63, which are connected via a bus.

The CPU 61 of the label printer 1 is connected to the display device 3, the touch panel 4, the keyboard 5, and the weighing scale 8 which are all connected via a variety of input and output circuits (not shown). The above-described elements are controlled by the CPU 61.

The CPU 61 of the label printer 1 is connected to a HDD (Hard Disk Drive) 64. The HDD 64 stores programs or various kinds of files. All or a part of the programs or the various kinds of files stored in the HDD 64 are copied to the RAM 63 when the label printer 1 is activated, and sequentially are executed by the CPU 61. An example of the programs stored in the HDD 64 is a program PR for label printing. An example of the files stored in the HDD 64 is the PLU file F1 which is delivered from a store computer SC and is stored.

Figure 4:
FIG. 4 is a conceptual diagram illustrating an example of a data configuration of a PLU file.

The PLU file F1 is a file in which correlation between information related to registration for sales of a product and an image of the product is set for each of products arranged and sold in a store. FIG. 4 is a conceptual diagram illustrating an example of a data configuration of the PLU file F1. As shown in FIG. 4, the PLU file F1 is a file which stores information regarding a product such as a product ID uniquely allocated to each product, a product classification to which the product belongs, a product name, and a unit price, a product image obtained by imaging the product, a threshold value of "similarity: 0.XX". Although details are described later, using the threshold value of "similarity: 0.XX", it is possible to determine that, if a product is a fruit or a fresh vegetable, and the freshness thereof is lowered and is thus discolored, the product is different from a normal state product through the comparison with a product image of the product which is stored in the PLU file F1 in advance.

Referring to FIG. 3 again, the CPU 61 of the label printer 1 is connected to a communication interface 25 for executing data communication with the store computer SC via the input and output circuits (not shown). The store computer SC is installed at the backyard of the store or the like. An HDD (not shown) of the store computer SC stores the PLU file F1 which is delivered to the label printer 1.

In addition, the CPU 61 of the label printer 1 is connected to the product reading portion 10. In addition, the CPU 61 of the label printer 1 is connected to the first printer 6 and the second printer 7 which are two printer units performing label printing. The label printer 1 performs label printing under the control of the CPU 61.

The product reading portion 10 also has a microcomputer 110. The microcomputer 110 includes a CPU 101, a ROM 102, and a RAM 103 which are connected to each other via a bus. The ROM 102 stores programs executed by the CPU 101.

The CPU 101 is connected to the imaging portion 104 and a sound output portion 105 via a variety of input and output circuits (not shown). Operations of the imaging portion 104 and the sound output portion 105 are controlled by the CPU 101.

The imaging portion 104 is a color CCD image sensor, a color CMOS image sensor, or the like, and is imaging means for performing imaging from the reading window 9 under the control of the CPU 101. For example, the imaging portion 104 captures moving images at 30 fps. Frame images which are sequentially captured by the imaging portion 104 at a predetermined frame rate are preserved in the RAM 103.

The sound output portion 105 includes a sound circuit, a speaker, and the like for generating a warning sound or the like set in advance. The sound output portion 105 sends a notification using sounds such as a warning sound under the control of the CPU 101.

In addition, under the control of the CPU 101, images (images including the overall product or a part thereof) captured by the imaging portion 104 of the product reading portion 10 are input to the CPU 61 of the label printer 1.

Figure 5:
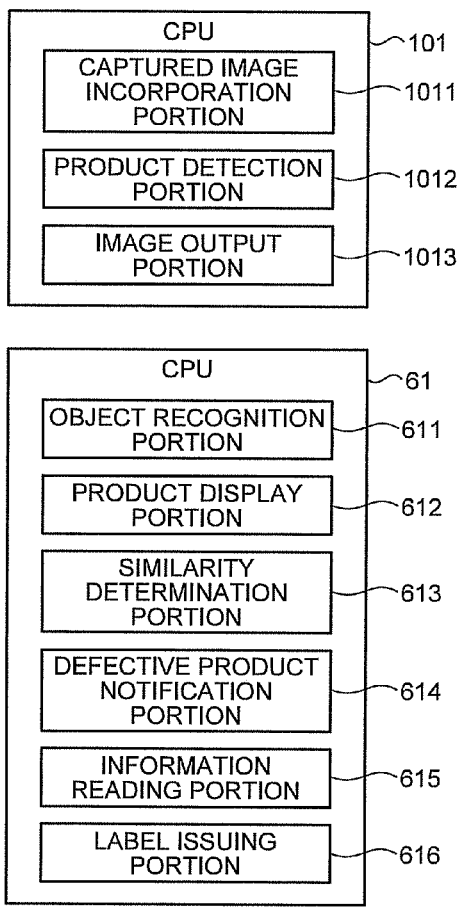
FIG. 5 is a block diagram illustrating a functional configuration of CPUs.

Next, functional portions of the CPU 101 and the CPU 61 realized by the CPU 101 and the CPU 61 sequentially executing programs will be described with reference to FIG. 5. FIG. 5 is a block diagram illustrating a functional configuration of the CPU 101 and the CPU 61. As shown in FIG. 5, the CPU 101 sequentially executes the programs and thereby functions as a captured image incorporation portion 1011, a product detection portion 1012, and an image output portion 1013 which is image output means. In a similar manner, the CPU 61 functions as an object recognition portion 611 which is object recognition means, a product display portion 612 which is notification means, a similarity determination portion 613 which is similarity determination means, a defective product notification portion 614 which is defective notification means, an information reading portion 615 which is information reading means, and a label issuing portion 616 which is label issuing means.

The captured image incorporation portion 1011 outputs an imaging start signal to the imaging portion 104 such that the imaging portion 104 starts an imaging operation. The captured image incorporation portion 1011 sequentially incorporates frame images which are captured by the imaging portion 104 and are preserved in the RAM 103 after the start of the imaging operation. The incorporation of the frame images by the captured image incorporation portion 1011 is performed in an order to be preserved in the RAM 103.

The product detection portion 1012 detects the overall product or a part thereof included in the frame images incorporated by the captured image incorporation portion 1011 using a pattern matching technique or the like. Specifically, the product detection portion 1012 extracts an outline or the like from a binarized image of the incorporated frame image. Next, the product detection portion 1012 compares an outline from the previous frame image with an outline from this frame image, and detects a changed part, that is, a ghost image of a product facing the reading window 9 for registration for sales. In addition, as other methods of detecting a product, whether or not there is a skin color region is detected from read frame images. Then, if the skin color region is detected, that is, if a ghost image of a hand of the store clerk is detected, an outline of the product which is assumed to be grasped by the hand of the store clerk is tried to be extracted by performing the above-described outline detection. At this time, if an outline indicating a shape of the hand and other outlines are detected, a ghost image of the product is detected from a state where the store clerk grasps the product with the hand.

The image output portion 1013 outputs the frame images incorporated by the captured image incorporation portion 1011 to the CPU 61 of the label printer 1. The image output portion 1013 may sequentially output the frame images incorporated by the captured image incorporation portion 1011 to the CPU 61 of the label printer 1; however, in the embodiment, it is assumed that frame images where the overall product or a part thereof is detected by the product detection portion 1012 are output to the CPU 61 of the label printer 1. As such, by outputting the frame images where the overall product or a part thereof is detected by the product detection portion 1012 to the CPU 61 of the label printer 1, it is possible to prevent the CPU 61 of the label printer 1 from performing the object recognition by referring to the PLU file F1 using frame images which do not include any or a part of the product. Since the recognition process of a specific object takes processing time, it is possible to reduce the processing time by preventing frame images which have no probability of recognizing a specific object and do not include any or a part of the product, from being processed.

The object recognition portion 611 refers to product images of the PLU file F1, and recognizes a product as a specific object by reading a surface state such as a tone or an unevenness situation of the surface as a feature amount from images of the overall product or a part thereof captured by the imaging portion 104 of the product reading portion 10. In addition, it is assumed that the object recognition portion 611 does not take into consideration of an outline or a size of a product in order to reduce processing time. The CPU 61 of the label printer 1 can specify a product read by the product reading portion 10 among products set in the PLU file F1 in advance, based on a result recognized by the object recognition portion 611.

The similarity determination portion 613 calculates similarity of the product recognized by the object recognition portion 611, and determines whether or not the similarity exceeds a threshold value which is set in the PLU file F1 in advance.

The recognition of an object included in an image in this way is called generic object recognition. For the generic object recognition, the following document describes a variety of recognition techniques.

Keiji YANAI, "The Current State and Future Directions on Generic Object Recognition", Information Processing Society Journal, Vol 48, No. SIG 16 [searched on Aug. 10, 2010], Internet <URL: http://mm.cs.uec.ac.jp/IPSJ-TCVIM-Yanai.pdf>.

In addition, a technique in which generic object recognition is performed by dividing an image into regions for each object is described in the following document.

Jamie Shotton et al., "Semantic Texton Forests for Image Categorization and Segmentation", [searched on Aug. 10, 2010], Internet <URL: http://citeseerx.ist.psu.edu/viewdoc/download?doi=10.1.1.145.3036&rep=rep1&type=pdf>.

The information reading portion 615 reads information related to the product image recognized by the object recognition portion 611, that is, a product ID, a product classification, a product name, a unit price, and the like of the product specified as the product read by the product reading portion 10, and the product display portion 612 displays the information related to the product on the display device 3.

The label issuing portion 616 prints the information related to the product read by the information reading portion 615 on a label and issues the label.

Figure 6:
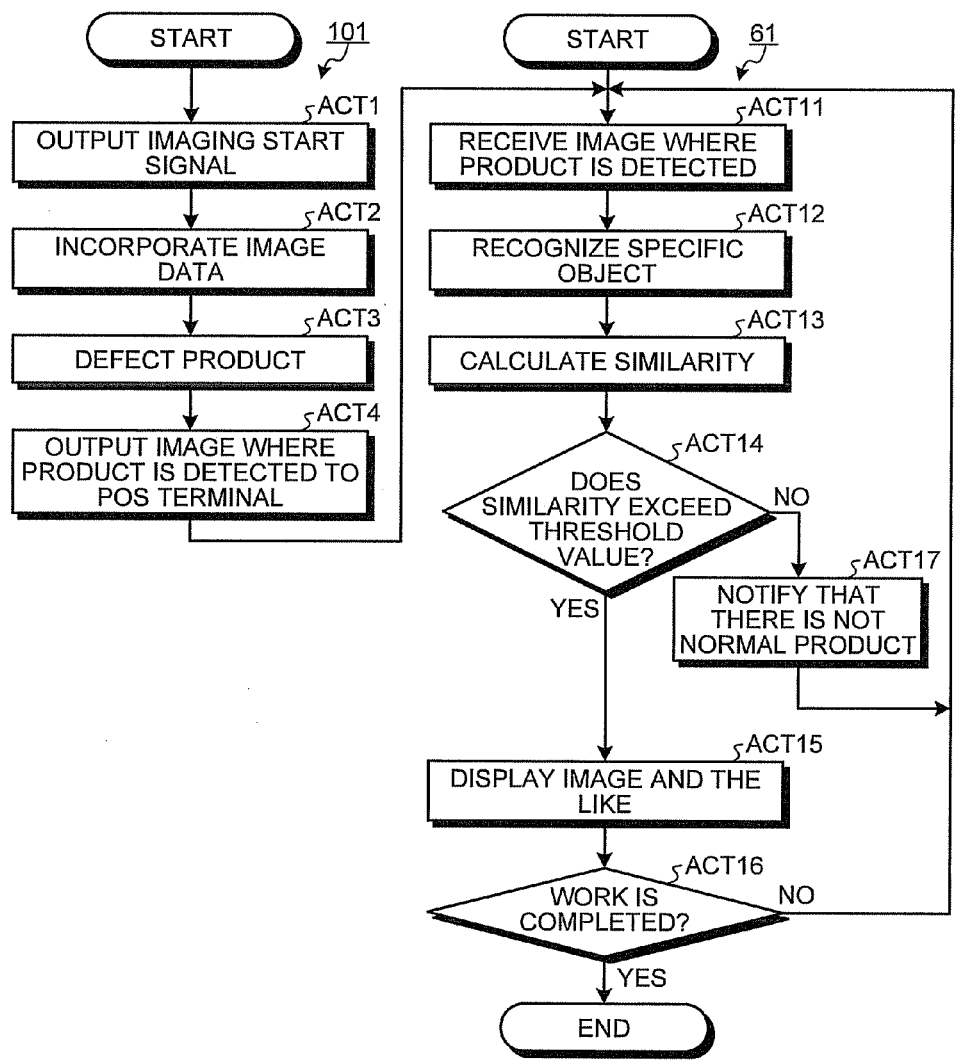
FIG. 6 is a flowchart illustrating an example of a processing operation of the label printer.

Next, an operation of the label printer 1 will be described in detail. FIG. 6 is a flowchart illustrating an example of an operation of the label printer 1 according to the embodiment.

As shown in FIG. 6, if the process starts through the pressing of, for example, a production confirmation mode key (not shown) provided in the keyboard 5, the captured image incorporation portion 1011 outputs an imaging start signal to the imaging portion 104 such that the imaging portion 104 starts imaging (ACT 1). Next, the captured image incorporation portion 1011 incorporates frames images (captured images) which are captured by the imaging portion 104 and are preserved in the RAM 103 (ACT 2). Then, the product detection portion 1012 detects the overall product or a part thereof from the frame images incorporated by the captured image incorporation portion 1011 (ACT 3). Next, the image output portion 1013 outputs the frame images where the overall product or a part thereof is detected by the product detection portion 1012 to the CPU 61 side (ACT 4).

Figure 7:
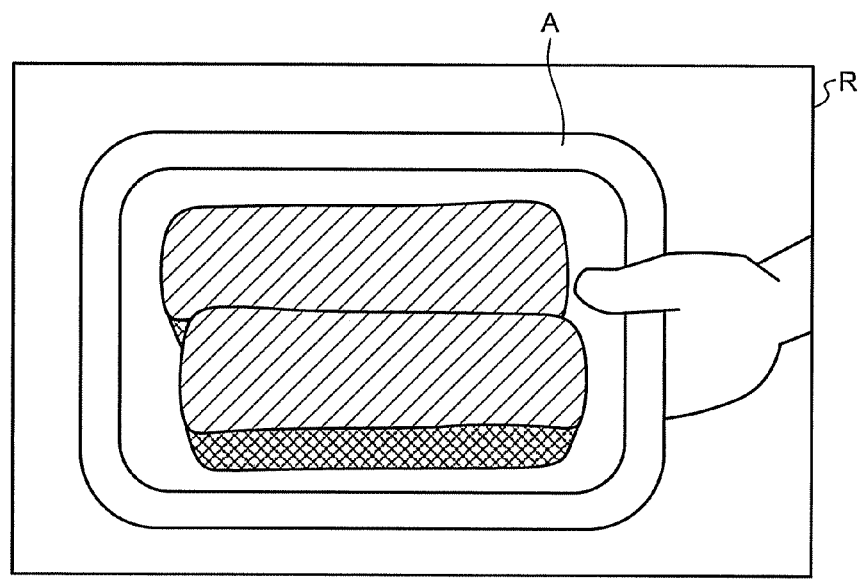
FIG. 7 is a conceptual diagram illustrating an example of a reading region in a reading window.

FIG. 7 is a conceptual diagram illustrating an example of a reading region R in the reading window 9. Specifically, FIG. 7 is a conceptual diagram exemplifying the reading region R when a product A is read. As shown in FIG. 7, when the product A casts a glare on the reading region R in the course of the movement of the product A, the overall product A or a part thereof is detected from frame images obtained by capturing the reading region R in ACT 3. In ACT 4, the frame images obtained by capturing the reading region R are output to the CPU 61 due to the detection of the overall product A or a part thereof.

Next, as shown in FIG. 6, the CPU 61 receives the frame images where the overall product A or a part thereof is detected, output from the product reading portion 10 (ACT 11) Thereafter, the object recognition portion 611 refers to a product image of the FLU file F1, and recognizes the product A as a specific object from the image of the overall product A or a part thereof, output from the product reading portion 10 (ACT 12).

Next, the similarity determination portion 613 calculates similarity of the product A recognized by the object recognition portion 611 (ACT 13). The similarity indicates to what degree the image of the overall product A or a part thereof output from the product reading portion 10 is similar if a product image of each product stored in the PLU file F1 is 100%="similarity: 1.0". As described above, the similarity is calculated according to a surface state such as, for example, a tone or an unevenness situation of the surface. In addition, for example, weighting thereof may be changed in the tone or the unevenness situation.

Next, the similarity determination portion 613 determines whether or not the similarity calculated in ACT 13 exceeds a threshold value ("similarity: 0.XX") set in advance (ACT 14).

If the similarity determination portion 613 determines that the similarity calculated in ACT 13 exceeds the threshold value ("similarity: 0.XX") set in advance (ACT 14: Yes), in ACT 15, the information reading portion 615 reads information (a product ID, a product classification, a product name, a unit price, and the like) related to the product image of the product A which is a specific object recognized by the object recognition portion 611, and the product display portion 612 displays the information related to the product image of the product A on the display device 3 (ACT 15).

Figure 8:
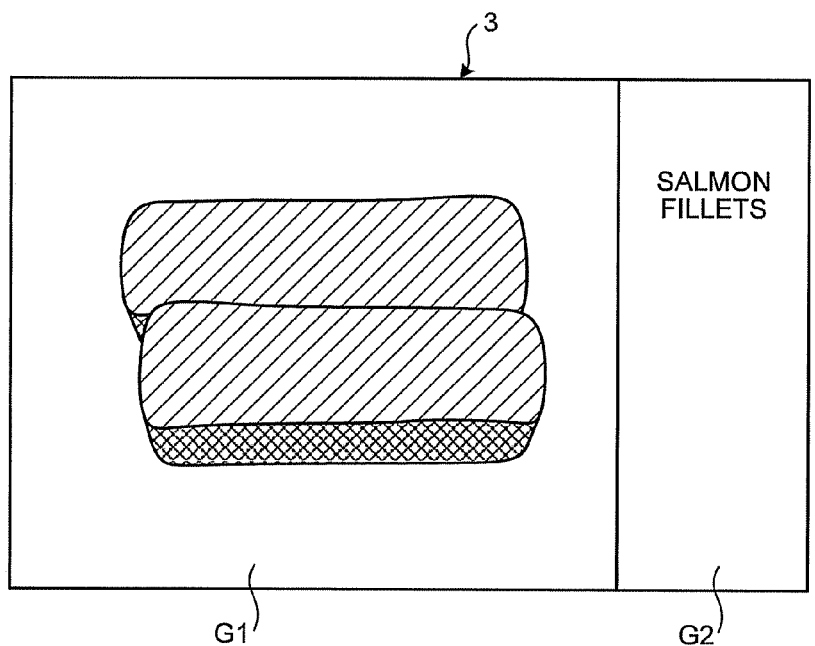
FIG. 8 is a front view illustrating a screen display example on a display device.

FIG. 8 shows a screen display example on the display device 3. In the example shown in FIG. 8, the image of the product A is displayed on a display region G1, and product information such as the product name of the product A preserved in advance is displayed on a display region G2 together. Through the screen display, since the kind of fish can be grasped without having professional knowledge, for example, if fish fillets are packed in the backyard, it is possible to assist in determining the kind of fish fillets or the like.

Thereafter, the CPU 61 determines whether or not the work is completed due to an operation instruction of the keyboard 5 or the like (ACT 16). If the work is continued (ACT 16: No), the CPU 61 makes the process return to ACT 11 such that the process is continued. If the work is completed (ACT 16: Yes), the CPU 61 completes the process.

On the other hand, if the similarity determination portion 613 determines that the similarity calculated in ACT 13 does not exceed the threshold value ("similarity: 0.XX") set in advance (ACT 14: No), the defective product notification portion 614 notifies a store clerk that the product is not recognized as a normal product (ACT 17), and demands the store side to take measures such as sales stop. Specifically, the defective product notification portion 614 notifies the store clerk of errors through screen display on the display device 3, an output of a warning sound from the sound output portion 105, or the like. The label printer 1 can demand the store clerk to perform an appropriate operation such as reading another product A through this notification.

Figure 9:
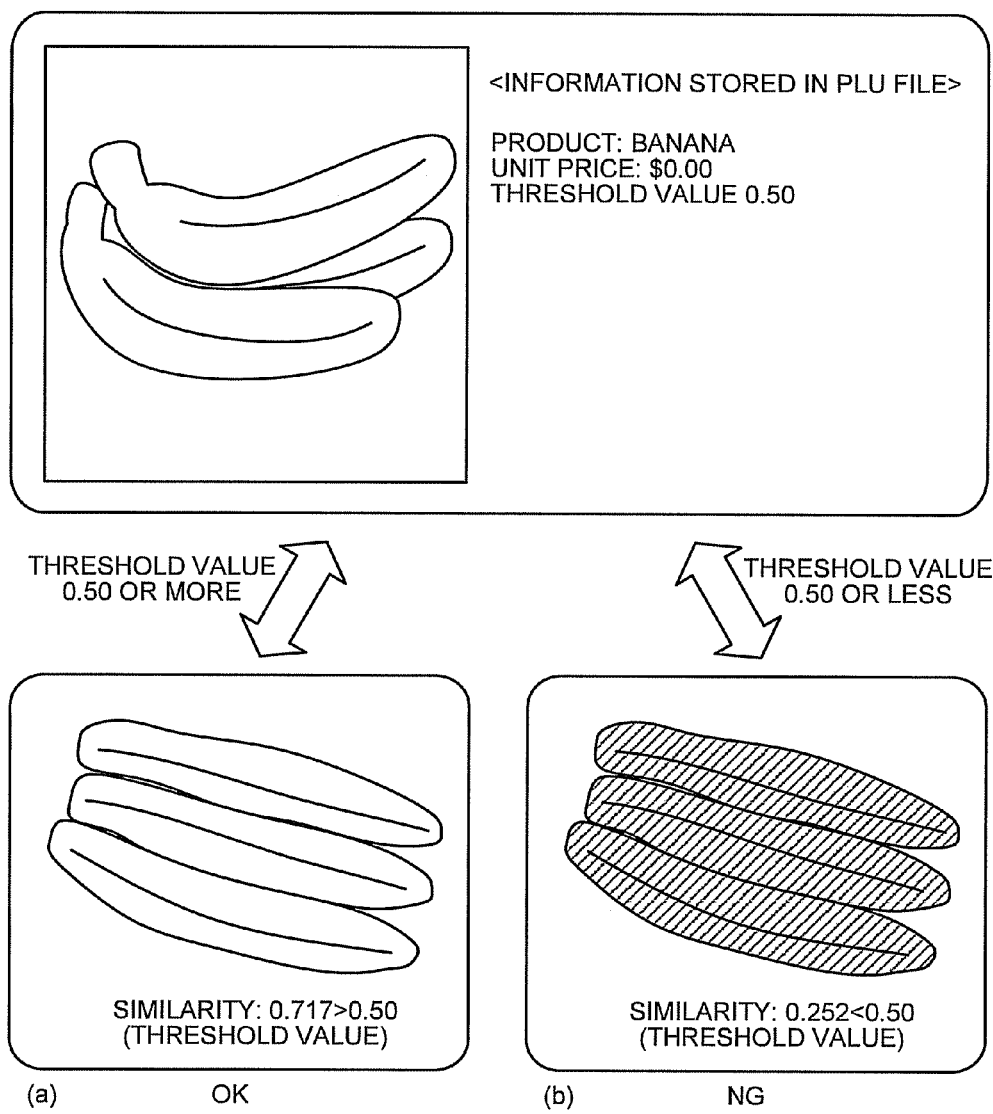
FIG. 9 is a schematic diagram illustrating a detailed example of the process.

As shown in FIG. 9, if the product A recognized by the object recognition portion 611 is a "banana", and the threshold value is stored in the PLU file F1 as "similarity: 0.50", since the similarity of a product shown in (a) of FIG. 9 is 0.717, it is determined that the calculated similarity exceeds the preset threshold value. On the other hand, the similarity of a product shown in (b) of FIG. 9 is 0.252, and thus it is determined that the calculated similarity does not exceed the preset threshold value. Therefore, the product shown in (a) of FIG. 9 is registered for sales as a "banana" as usual. On the other hand, the product shown in (b) of FIG. 9 is temporarily recognized as a "banana", but is not registered for sales due to a defective product which is old and discolored, damaged, and deformed, that is, of which a tone or an unevenness situation of a surface is not normal. In a similar manner, for ready-made foods, a product image based on a normal baked state or fried state is stored in the PLU file F1, and if insufficient or excessive baking, insufficient or excessive frying, or the like is deviated from a threshold value, the ready-made food may be determined as being a defective product.

As such, according to the label printer 1 in the embodiment, if old and discolored, damaged, deformed, and different in a tone due to poor cooking, fish or ready-made foods which are deviated from a reference may be determined as being a defective product, through comparison with a product image stored in the PLU file F1.

Particularly, even in a store which has a limitation in time for checking freshness of products such as a busy store, or a store which has personal differences in cooking read-made foods due to employment of many store clerks, it is possible to perform the comparison with a normal product through the numerical determination.

In addition, in the embodiment, although objects to be recognized are products for sales stored in the PLU file F1, the objects are not limited thereto, but may be promotional products for promoting sales, or the like.

A program executed in the label printer 1 according to the embodiment is provided in a state of being embedded in the ROM or the like in advance. The program executed by the label printer 1 according to the embodiment may be recorded on a computer readable recording medium such as a CD-ROM, a flexible disc (FD), a CD-R, or a DVD (Digital Versatile Disc) as a file with a format which can be installed or executed, and may be provided.

In addition, the program executed by the label printer 1 according to the embodiment may be stored in a computer connected to a network such as the Internet, and may be provided through downloading via the network. The program executed by the label printer 1 may be provided or distributed via a network such as the Internet.

The program executed by the label printer 1 according to the embodiment has a module configuration including the above-described respective portions (the object recognition portion 611, the product display portion 612, the similarity determination portion 613, the detective product notification portion 614, the information reading portion 615, the label issuing portion 616, the captured image incorporation portion 1011, the product detection portion 1012, and the image output portion 1013). In practical hardware, the CPU (processor) reads and executes the program from the ROM and thereby the above-described portions are loaded to a main storage device, and the object recognition portion 611, the product display portion 612, the similarity determination portion 613, the detective product notification portion 614, the information reading portion 615, the label issuing portion 616, the captured image incorporation portion 1011, the product detection portion 1012, and the image output portion 1013 are created on the main storage device.

Next, a second embodiment will be described. In addition, portions which are the same as in the first embodiment are given the same reference numeral, and description thereof will be omitted. In the first embodiment, there is the description where an object is recognized and a notification of information for the recognized object is sent, for example, if fish fillets are packed in the backyard. In this embodiment, a label is further issued based on the information for the recognized object.

Figure 10:
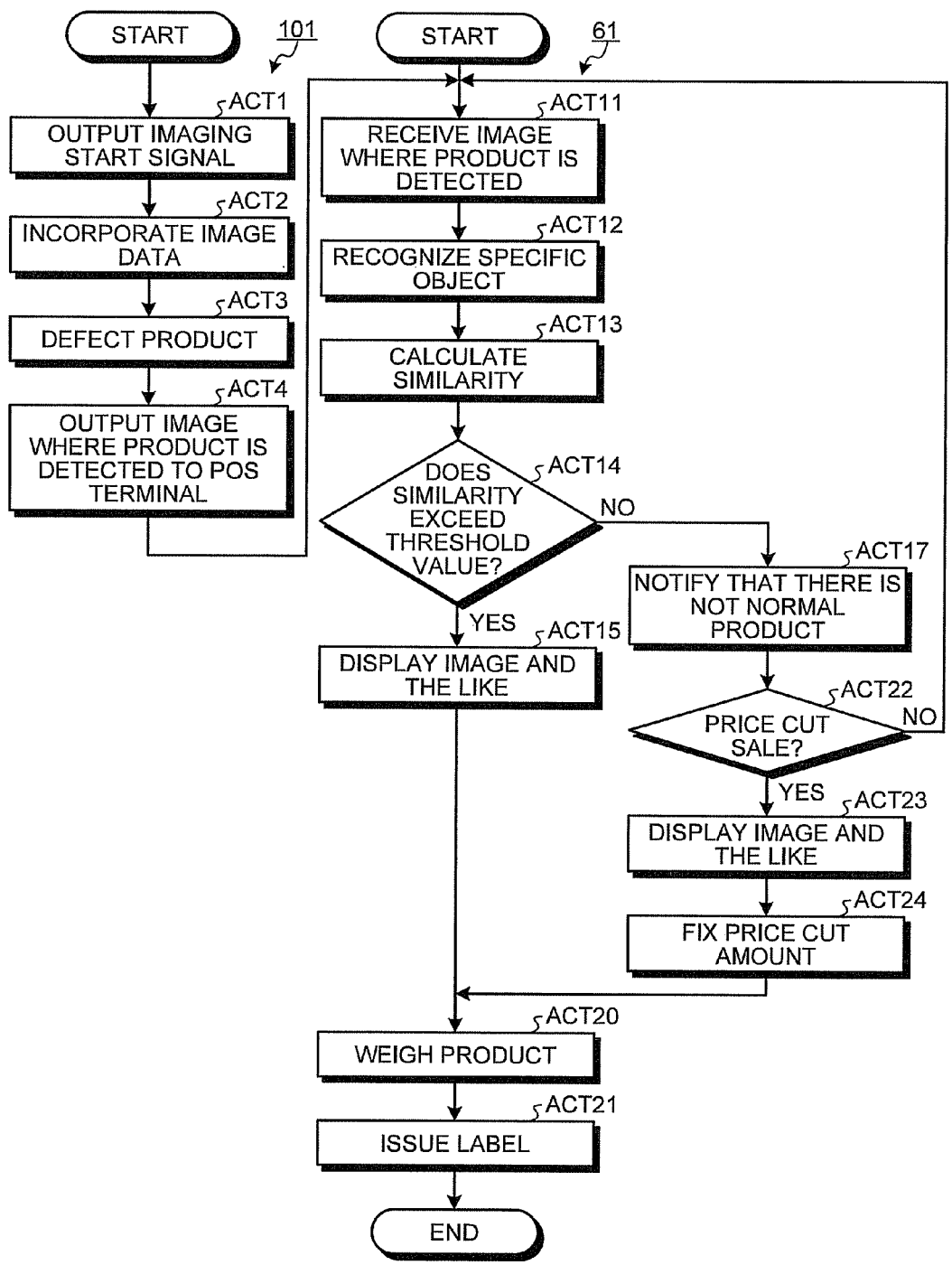
FIG. 10 is a flowchart illustrating an example of an operation of a label printer according to a second embodiment.

FIG. 10 is a flowchart illustrating an example of an operation of the label printer 1 according to the embodiment. As shown in FIG. 10, if the process starts through the pressing of, for example, a label issuing mode key (not shown) provided in the keyboard 5, the captured image incorporation portion 1011 outputs an imaging start signal to the imaging portion 104 such that the imaging portion 104 starts imaging (ACT 1). Next, the captured image incorporation portion 1011 incorporates frames images (captured images) which are captured by the imaging portion 104 and are preserved in the RAM 103 (ACT 2). Then, the product detection portion 1012 detects the overall product or a part thereof from the frame images incorporated by the captured image incorporation portion 1011 (ACT 3). Next, the image output portion 1013 outputs the frame images where the overall product or a part thereof is detected by the product detection portion 1012 to the CPU 61 side (ACT 4).

Next, the CPU 61 receives the frame images where the overall product A or a part thereof is detected, output from the product reading portion 10 (ACT 11). Thereafter, the object recognition portion 611 refers to a product image of the PLU file F1, and recognizes the product A as a specific object from the image of the overall product A or a part thereof, output from the product reading portion 10 (ACT 12).

Next, the similarity determination portion 613 calculates similarity of the product A recognized by the object recognition portion 611 (ACT 13).

Thereafter, the similarity determination portion 613 determines whether or not the similarity calculated in ACT 13 exceeds a threshold value ("similarity: 0.XX") set in advance (ACT 14).

If the similarity determination portion 613 determines that the similarity calculated in ACT 13 exceeds the threshold value ("similarity: 0.XX") set in advance (ACT 14: Yes), in ACT 15, the information reading portion 615 reads information (a product ID, a product classification, a product name, a unit price, and the like) related to the product image of the product A which is a specific object recognized by the object recognition portion 611, and the product display portion 612 displays the information related to the product image of the product A on the display device 3 (ACT 15). In addition, an operator places the product A on the weighing scale 8 until the information (the product ID, the product classification, the product name, the unit price, and the like) related to the product image of the product A is displayed on the display device 3 at latest.

Figure 11:
FIG. 11 is a plan view illustrating an example of an issued label.

Further, the CPU 61 measures the product placed on the weighing scale 8 by weight (ACT 20), generates printing data based on the read information (the product ID, the product classification, the product name, the unit price, and the like) and the measured weight, and prints and issues a label based on the generated printing data (ACT 21). FIG. 11 is a plan view illustrating an example of an issued label L1. As shown in FIG. 11, the product name, the unit price, the weight, the price according to the weight, and the like are printed on the label L1.

On the other hand, if the similarity determination portion 613 determines that the similarity calculated in ACT 13 does not exceed the threshold value ("similarity: 0.XX") set in advance (ACT 14: No), the defective product notification portion 614 notifies a store clerk that the product is not recognized as a normal product (ACT 17), and demands the store side to take measures such as sales stop or a price cut sale. Specifically, the defective product notification portion 614 notifies the store clerk of errors through screen display on the display device 3, an output of a warning sound from the sound output portion 105, or the like.

If the CPU 61 determines whether or not there is an instruction for the price cut sale through an operation instruction of the keyboard 5 (ACT 22: Yes), the information reading portion 615 reads the information (the product ID, the product classification, the product name, the unit price, and the like) related to the product image of the product A which is a specific object recognized by the object recognition portion 611. The product display portion 612 displays the information related to the product image of the product A on the display device 3 (ACT 23) and fixes a price cut amount of the product A which is not recognized as the normal product (ACT 24). In addition, a price cut rate or the price cut amount used when the product A which is not recognized as the normal product is sold by cutting down the price may be set in a stepwise manner. The price cut rate or the price cut amount may be set according to the similarity in a stepwise manner by correlating with, for example, a plurality of threshold values (similarity: 0.XX) stored in the PLU file F1 in advance.

On the other hand, if it is determined that there is an instruction for sales stop through an operation instruction of the keyboard 5 (ACT 22: No), the process returns to ACT 11.

Figure 12:
FIG. 12 is a plan view illustrating an example of an issued label.

Thereafter, the CPU 61 measures the product placed on the weighing scale 8 by weight (ACT 20). The label issuing portion 616 generates printing data based on the read information (the product ID, the product classification, the product name, the unit price, and the like), the price cut amount, and the measured weight, and prints and issues a label based on the generated printing data (ACT 21). FIG. 12 is a plan view illustrating an example of an issued label L2. In the label L2 shown in FIG. 12, since the product is not recognized as the normal product, the price cut amount ($2.00) and a price obtained by subtracting the price cut amount ($2.00) from a usual price are displayed.

In addition, the embodiment is not limited to the case of displaying the price obtained by subtracting the price cut amount from the usual price on the label as in FIG. 12, but, as shown in FIG. 13, a price cut label L3 indicating the price cut amount ($2.00) may be printed and issued separately from the normal label L1 (the same as in FIG. 11).

A novel effect and modified example can be easily derived by a person skilled in the art. Therefore, wider aspects of the exemplary embodiments are not limited to the specific details and representative embodiment which have been shown and described hitherto. Accordingly, the accompanying claims and their equivalents are intended to cover such forms or modifications as would fall within the scope and spirit of the embodiments.

In addition, although it is determined whether or not there is an instruction for sales stop through an operation instruction of the keyboard 5 in ACT 22 in the embodiments, the embodiment is not limited thereto, but a price cut process and a label issuing process may be performed or stopped directly depending on an object recognition result. For example, if a product is not recognized as a normal product, a price cut amount is fixed and price cut information is printed on a label depending on the object recognition result even if there is no instruction for a price cut sale through the operation instruction of the keyboard 5 or the like (alternatively, the price cut process or the label issuing process is stopped depending on the object recognition result).

What is claimed is:

1. A label issuing device comprising:
an imaging portion;
an image output portion that outputs an image captured by the imaging portion;
an object recognition portion that recognizes a specific object by reading a feature amount of the output images;
an information reading portion that reads information related to the recognized object from a file storing the information related to the recognized object;
a label issuing portion that prints the read information related to the object on a label and issues the label;
a normal/defective product determination portion that compares a similarity between the output image and a predetermined reference image with a predetermined threshold to determine that the object is not a normal product when the similarity does not exceed the threshold; and
a defective product notification portion that sends a notification indicating that the object is not a normal product when the normal/defective product determination portion determines that the object is not a normal product.

2. The device according to claim 1, further comprising a notification portion that sends a notification of the read information related to the object.

3. The device according to claim 1, wherein the similarity is calculated according to a surface state of the object as the feature amount of the images.

4. The device according to claim 1, wherein the label issuing portion prints price cut information for the object which is not normal product on a label and issues the label, when the notification indicating that the object is not a normal product is sent by the defective product notification portion.

5. The device according to claim 1, wherein the label issuing portion prints price cut information for the object which is not a normal product on a label and issues the label, when there is an instruction for a price cut sale after the notification indicating that the object is not a normal product is sent by the defective product notification portion.

6. The device according to claim 5, wherein the threshold includes a plurality of thresholds, and the price cut information for the object includes a plurality of price cut information pieces for the object which are set in stages corresponding to the plurality of thresholds.

7. The device according to claim 1, wherein the label issuing portion stops printing the information related to the object which is not a normal product on a label and issuing the label, when the notification indicating that the object is not a normal product is sent by the defective product notification portion.

8. The device according to claim 1, wherein the label issuing portion stops printing the information related to the object which is not a normal product on a label and issuing the label, when there is an instruction for stopping a sale after the notification indicating that the object is not a normal product is sent by the defective product notification portion.

9. A label issuing method comprising:
outputting an image captured by an imaging portion;
recognizing a specific object by reading a feature amount of the output images;
reading information related to the recognized object from a file storing the information related to the recognized object;
printing the read information related to the object on a label and issuing the label;
comparing a similarity between the output image and a predetermined reference image with a predetermined threshold to determine that the object is not a normal product when the similarity does not exceed the threshold; and
sending a notification indicating that the object is not a normal product when the object is determined not to be a normal product.

10. The method according to claim 9, further comprising sending a notification of the read information related to the object.

11. The method according to claim 9, wherein similarity is calculated according to a surface state of the object as the feature amount of the images.

\* \* \* \* \*